United States Patent [19]
Fraudin

[11] 3,866,462
[45] Feb. 18, 1975

[54] SURFACE STRESS MEASURING APPARATUS

[75] Inventor: Claude J. Fraudin, Montlignon, France

[73] Assignee: Centre D'Etudes et De Recherches De La Machine Outil, Neuilly Sur Seine, Hauts De Seine, France

[22] Filed: July 19, 1973

[21] Appl. No.: 380,853

[30] Foreign Application Priority Data
July 25, 1972 France............................ 72.26758

[52] U.S. Cl......... 73/88.5 R, 73/DIG. 2, 324/34 ST
[51] Int. Cl. .............................................. G01l 1/12
[58] Field of Search.................. 73/DIG. 2, 88.5 R; 324/34 ST, 34 MA

[56] References Cited
UNITED STATES PATENTS
2,553,833  5/1951  Rifenbergh ..................... 73/DIG. 2
2,637,205  5/1953  Miller ............................. 73/DIG. 2
3,340,729  9/1967  Scoppe ........................... 73/DIG. 2

*Primary Examiner*—Charles A. Ruehl
*Attorney, Agent, or Firm*—Marn & Jangarathis

[57] ABSTRACT

A stress gauge is described for measuring surface stresses, such as in rotating shafts of magnetostrictive material. The gauge includes a stationary member facing the surface or surrounding it in the case of a shaft. The surface of the stationary member has two circumferentially extending rows of poles facing the magnetostrictive material. A first series of windings link the poles of each row while another series of windings link the poles of each column. When the magnetostrictive material is unstressed, energization of one of the series of windings will produce a magnetic flux which has zero linkage with the other series of windings. When the material is stressed, the flux is distorted and couples the other series of windings in proportion to the degree of stress.

7 Claims, 9 Drawing Figures

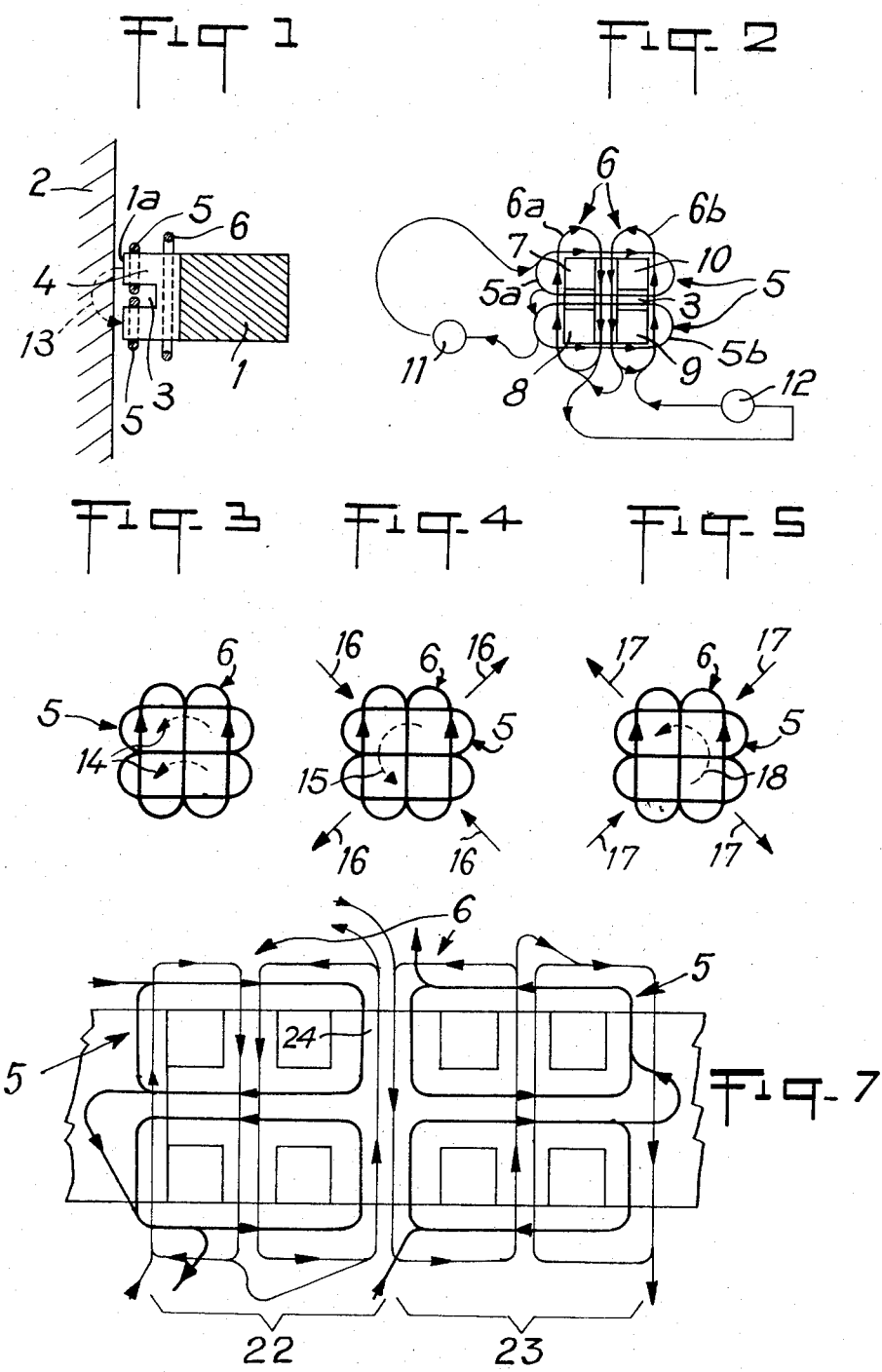

SURFACE STRESS MEASURING APPARATUS

BACKGROUND OF THE INVENTION

1. Field of the Invention

The invention relates to surface stress measuring apparatus.

2. Description of the Prior Art

Stress gauges are known which make use of the fact that magnetostrictive materials subjected to stress undergo changes in magnetic properties. Hitherto, stress gauges using magnetostrictive properties have been complex bulky and difficult to construct, in particular when measuring stresses in rotating bodies.

An object of the invention is to provide a simple and compact stress gauge using magnetostrictive properties.

A further object of the invention is to provide a stress gauge which can measure surface stresses in rotating parts without being required to rotate with the part.

SUMMARY OF THE INVENTION

According to the invention, there is provided apparatus for measuring surface stresses in structures made of magnetostrictive material, comprising a magnetizable body having a group of four poles arranged in two rows and two columns which are arranged to face the surface of the structure in which the stresses are to be measured, a first coil arranged to be connected to a source of alternating current and having two windings connected in series and each winding encircling a corresponding row of poles in such a manner that the magnetic flux created by a current passing through the coil follows a path from one row of poles to the adjacent row of poles through the structure under investigation and a second coil arranged to be connected to a measuring device and having two windings connected in series and each winding encircling a corresponding column of poles in such a manner that the magnetic flux created if current is passed through the second coil follows a path from one column of poles to the adjacent column of poles through the structure under investigation, whereby a change in the stress in the said structure alters the flux distribution between the two coils.

According to the invention, there is further provided apparatus for measuring surface stress in a magnetostrictive structure, comprising an annular magnetizable body a plurality of poles arranged in columns and rows extending around the inner circumferential surface of the body and arranged to face a structure encircled thereby, a first coil having windings respectively encircling each adjacent pair of rows of the poles the windings being connected in series in a manner so that when the coil is energized adjacent pairs of rows will produce an oppositely directed magnetic flux pattern, and a second coil having windings each of which encircles one pole in one pair of rows and the corresponding pole in the adjacent row of said pair, and, the windings being so connected that if the second coil is energized each pole of a column produces flux in the opposite direction to the flux produced by a pole in the same row of the adjacent column, whereby any change in stress in the said structure alters the flux path linking the first and second coils.

BRIEF DESCRIPTION OF THE DRAWINGS

Stress measuring apparatus embodying the invention will now be described, by way of example, with reference to the accompanying drawings in which:

FIG. 1 is a longitudinal section through the apparatus and an adjacent member whose stress is to be measured;

FIG. 2 is a front elevation of the apparatus of FIG. 1;

FIGS. 3, 4 and 5 are diagrams illustrating the current flow through the apparatus in response to different states of stress in the member whose stress is to be measured;

FIG. 7 is a fragmentary developed view of the coils used in the apparatus of FIG. 6;

DESCRIPTION OF THE PREFERRED EMBODIMENTS

Figure 9:
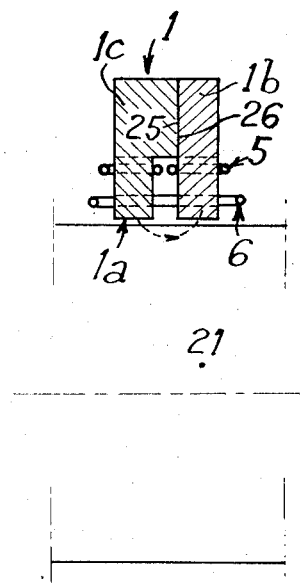
FIG. 9 is a view in section of a modified form of the apparatus of FIG. 6.

The apparatus shown in FIG. 1 includes a magnetizable body 1 having an operative surface 1a which is arranged to face a structure 2 to be investigated. The magnetizable body 1 has two slots 3 and 4 in the operative surface along which coils 5 and 6 extend.

The slots 3 and 4 in the operative surface 1a form four poles 7, 8, 9 and 10. The first coil 5 has two windings 5a and 5b connected in series; the winding 5a extends around the two adjacent poles 7 and 10 and the winding 5b extends around the two adjacent poles 8 and 9. The sense in which these windings are wound is as indicated by the associated arrows. Thus when the coil 5 is energized the poles 7 and 10 will have one magnetic polarity and the poles 8 and 9 will have the opposite magnetic polarity to produce a magnetic flux linking the body to the structure 2 as indicated by the arrow 13.

The second coil 6 as shown in FIG. 2 has two windings 6a and 6b connected in series. The winding 6a extends around the adjacent poles 7 and 8 while the winding 6b extends around the adjacent poles 9 and 10. The senses in which the windings are wound is as indicated by the associated arrows. Thus if the coil 6 is energized the magnetic flux created will link the two poles 7 and 8 with the two poles 9 and 10 via the structure 2.

The coils 5 and 6 are respectively connected to a source of alternating current 11 and a measuring device 12.

As shown in FIG. 2 the two slots 3 and 4 in which the two coils are wound extend perpendicular to one another; consequently, a magnetic flux generated by a current circulating in one of the coils will not generate any current in the other coil, assuming that the member 2 is magnetically isotropic. The arrows 14 in FIG. 3 indicate the direction of the magnetic flux created by an alternating current supplied to the coil 6. The flux generated emerges from the body 1 through the poles 9 and 10 and re-enters the body through the poles 7 and 8 after having passed through the member 2 which is magnetically isotropic. There is therefore no substantial cross linkage in the flux path between the two poles 7-10 and the two poles 8-9, and therefore no current induced in the coil 5.

FIG. 4 indicates the direction in which magnetic flux (arrow 15) circulates when the member 2 is subjected to stresses acting in the directions of the arrows 16. As a result, the flux produced by energization of the coil 6 manifests a change in direction and links the coil 5 to produce in the coil 5 a current proportional to the stresses prevailing in the member 2.

FIG. 5 indicates the direction which the magnetic flux takes (see arrow 18) when the stresses applied to the member 2 take the direction of the arrows 17. Here also a current proportional to the intensity of the stress is generated in the coil 5. In FIG. 5 the currents induced in the coil 5 are of course in the opposite direction to those in FIG. 4.

In FIGS. 4 and 5, the apparatus is assumed to be at an angle of 45° to the direction of applied stress that is, the angle between each slot and the applied stress is 45°. When the apparatus has this attitude with respect to the applied stresses the currents induced in the coil will be a maximum.

Figure 6:
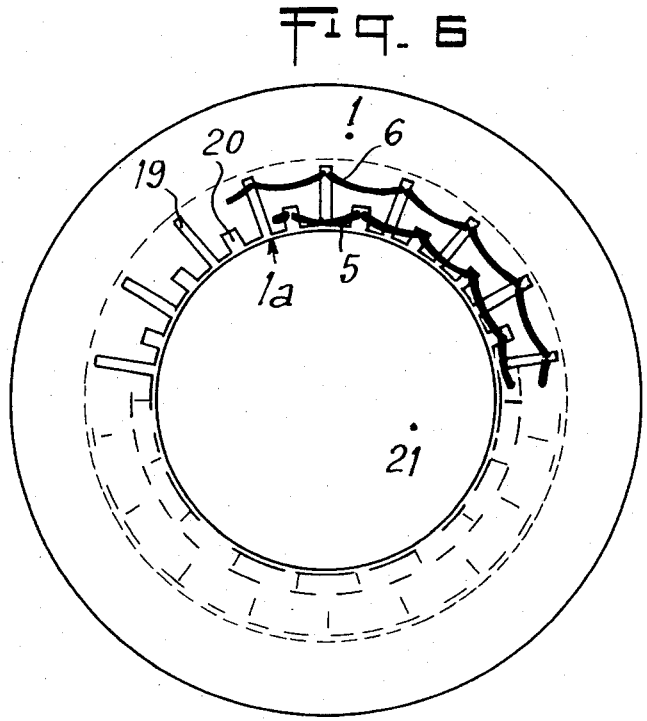
FIG. 6 is a fragmentary end elevation of a modified form of the stress measuring apparatus.

The stress measuring apparatus shown in FIG. 6 is arranged to measure stress in cylindrical body 21, also depicted therein, and includes an annular magnetizable body. The inner circumferential surface of the magnetizable body has a plurality of slots 19 and 20 which are intersected by a central circumferentially extending slot (shown dotted in FIG. 6) to define a plurality of groups of pole pieces, each group being similar to the group of four pole pieces shown in FIGS. 1 and 2 (see FIG. 7). Each group of pole pieces has two coils similar to the coils 5 and 6 of FIGS. 1 and 2 (see the developed winding diagram of FIG. 7 which shows two adjacent groups of pole pieces). The magnetizable body encircles a magnetostrictive shaft 21 in which stresses are to be measured. When stresses occur in the shaft, the two windings of each group of pole pieces will be magnetically coupled so that when the coils 6 of each group of pole pieces 22 and 23 are energized either in series or in parallel the instantaneous currents flowing through the coils 5 and 6 will be as indicated by the arrows.

It will be noted that the directions of the currents flwoing through the coils of one group 23 are opposite to the directions of the currents flowing through the coils in the adjacent group 22. This being the case, then when the shaft is in an unstressed condition and the coils 6 are energized there will be a flux linkage between adjacent groups 22 and 23 which will induce currents in the coils 5. Thus the coils 5 will provide an output even when the shaft 21 is not subjected to stress. In order to achieve a zero output from the coils 5 when the shaft is unstressed, the winding connections of each alternate group of pole pieces must be reversed.

Figure 8:
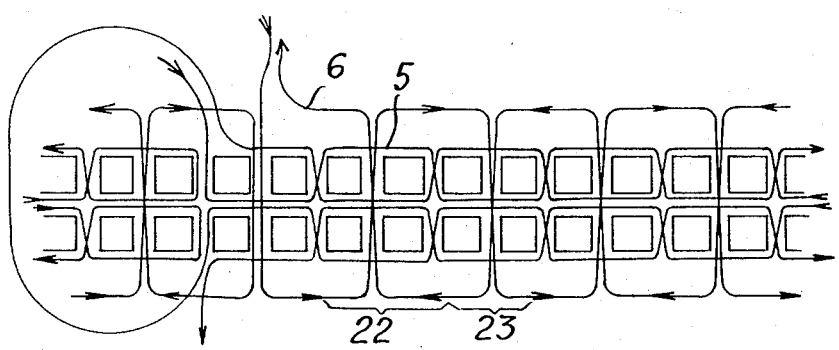
FIG. 8 is a developed view of part of a simplified winding system for the apparatus of FIG. 6.

From FIG. 7 it will be noted that where the coil 6 of two adjacent groups share a common slot, for example the slot 24, the effect of the currents in the slot produced by one coil are cancelled out by the effect of the currents in the slot produced by the adjacent coil. FIG. 8 shows a developed winding diagram in which the windings of the coil 6 in slots such as the slot 24 have been eliminated.

FIG. 9 shows a modified magnetizable body 1 having poles and windings similar to those shown in FIG. 8. The modified magnetizable body is made up of two axially positioned rings 1b and 1c each carrying half the total number of the poles of the magnetizable body. The adjacent annular flanks 25 and 26 of these rings are in contact, and the rings are secured together so that they can be rotated relative to one another.

In operation, when the series connected coils 6 are energized from a source of alternating current a magnetic flux is created which circulates between the shaft 21 and the body 1. If the shaft 21 is homogeneous and not subjected to stresses, this flux does not link the other coil 5 for the reasons hereinbefore explained. If now the shaft 21 is subjected to a stress, then for each group of four poles the flux will be distorted in a manner similar to that described with reference to FIGS. 4 and 5. An induced current is therefore produced in the winding 5 which current is proportional to the value of the stress.

The stress measured by the apparatus of FIGS. 6 or 9 is the mean surface stress on a shaft as measured at a plurality of discrete areas around the circumference of the shaft. In particular, when the shaft is subjected to torsion stresses in the surface of the shaft are directed at 45° with respect to the slots in the magnetizable body.

It will be appreciated that the stress measuring apparatus of FIGS. 6 or 9 described is capable of measuring the torsion applied to the shaft whether or not the shaft is rotating. The plurality of poles of the measuring apparatus enables the roundness of the shaft to be determined as well as the homogeneity of the metal of which the shaft is made.

Because the two parts 1b and 1c of the apparatus of FIG. 9 can rotate relative to one another it is possible to adjust the coupling between the windings 5 and 6 and thus set the output of the windings 5 of the apparatus to zero, to compensate for defects in the member to be measured.

The use of a single magnetic circuit for the excitation circuit and the measurement circuit of the stress measurement apparatus of all the Figures enables the apparatus to be compact and robust.

The arrangement of the windings as described with reference to FIG. 2 enables the measuring apparatus to be made very small indeed. Also it will be appreciated that as there is no contact between the rotating member and the measuring apparatus with the embodiments described in FIGS. 6 to 9, the speed of rotation of the shaft does not place any restriction on the use of the apparatus since there is no question of wear involved.

The measuring apparatus described is particularly suitable for use during the construction of machines.

Many modifications can be made to the invention without departing from the spirit and scope of the invention as defined by the appended claims.

I claim:

1. Apparatus for measuring surface stresses in structures including magnetostrictive material comprising:

a magnetizable body defining at least one group of four poles arranged in two adjacent rows and two adjacent columns, said group of poles being disposed to face a surface of a structure in which stresses are to be measured;

a first coil having first and second serially connected windings supported by said body, each of said first and second windings being wound about a corresponding one of said adjacent rows of poles, said first winding being wound in a first direction and said second winding being wound in a second direction opposite to said first direction;

means for applying alternating current to said first coil to generate a magnetic field, said magnetic field having an orientation such that magnetic flux created by current passing through said first coil is directed from one row of poles in said magnetizable body to said adjacent row through said structure being measured;

a second coil having third and fourth serially connected windings supported by said body, each of said third and fourth windings being wound about a corresponding one of said adjacent columns of said poles; and means for measuring current in said second coil, said first and second coils being disposed in such relation that magnetic flux produced by said first coil links said windings of said second coil to produce a measurable current flow in said second coil as a function of an altering of the flux distribution between said first and second coils resulting from a change in stress in said structure being measured.

2. The apparatus according to claim 1 wherein said magnetizable body takes the form of an annular member defining a plurality of four pole groups, each group having the four poles thereof arranged in two adjacent rows and columns and supporting said first and second coils, all of said first coils being interconnected in a manner to ensure oppositely directed current flow through said first coils of alternate ones of said four pole groups.

3. The apparatus according to claim 1 wherein said mangetizable body takes the form of an annular member defining a plurality of four pole groups, each group having the four poles thereof arranged in two adjacent rows and columns and supporting said first and second coils, all of said first coils being serially connected in a manner to ensure an oppositely directed current flow through said first coils of adjacent four pole groups.

4. The apparatus according to claim 3 wherein adjacent first coils of adjacent four pole groups are formed of a single winding forming said first and second windings of said adjacent first coils of said adjacent four pole groups.

5. The apparatus according to claim 3 wherein said annular member comprises:

a plurality of coaxial rings, one of said coaxial rings carrying one row of each of said four pole groups and another of said plurality of coaxial rings carrying the other row of each of said four pole groups; and means for adjustably securing said plurality of coaxial rings together for rotation relative to one another.

6. Apparatus for measuring surface stresses in structures including magnetostrictive material comprising:

an annular magnetizable body configured to surround a portion of a structure to be measured, said annular magnetizable body defining a plurality of poles disposed in two adjacent rows and a plurality of adjacent columns about an inner circumferential surface of said body and extending toward said portion of said structure to be meansured;

a first coil supported on said magnetizable body having winding portions disposed about adjacent pairs of said plurality of adjacent columns of poles, said winding portions of said first coil being serially connected in a manner to produce, upon energization, a magnetic field exhibiting flux lines having a first directivity for alternate pairs of said plurality of columns of poles and flux lines having a second, opposite directivity for intervening pairs of said plurality of columns of poles; and a second coil mounted on said magnetizable body having winding portions disposed in a row direction, each winding portion of said second coil being wound about adjacent pole pairs in a common row, said winding portions of said second coil being connected in a manner to ensure that each pole pair wound by a winding portion of said second coil exhibits an opposite winding direction from that exhibited by adjacent pole pairs in a common row and the adjacent pole pair of the other row whereby any change in stress in a structure being measured alters the flux path associated with said first and second coils.

7. The apparatus according to claim 6 wherein said annular magnetizable body comprises:

a pair of coaxial members, one of said coaxial members supporting one of said two adjacent rows of poles and the other of said pair of coaxial members supporting the other of said two adjacent row of poles; and means for adjustably securing said plurality of coaxial members together for rotation relative to one another.

* * * * *